US008291112B2

(12) United States Patent
Vasseur et al.

(10) Patent No.: US 8,291,112 B2
(45) Date of Patent: Oct. 16, 2012

(54) SELECTIVE A PRIORI REACTIVE ROUTING

(75) Inventors: Jean-Philippe Vasseur, Saint Martin d'Uriage (FR); Pascal Thubert, La Colle sur Loup (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 12/272,418

(22) Filed: Nov. 17, 2008

(65) Prior Publication Data

US 2010/0125674 A1    May 20, 2010

(51) Int. Cl.
  *G06F 15/16*    (2006.01)
(52) U.S. Cl. ......... 709/242; 709/240; 709/241; 709/245
(58) Field of Classification Search .................. 709/241, 709/242, 245, 238, 240
  See application file for complete search history.

(56) References Cited

U.S. PATENT DOCUMENTS

| | | | |
|---|---|---|---|
| 6,850,532 B2 | 2/2005 | Thubert et al. | |
| 7,190,678 B2 | 3/2007 | Thubert et al. | |
| 7,319,674 B2 | 1/2008 | Chandra et al. | |
| 7,363,387 B1 | 4/2008 | Chandra et al. | |
| 7,366,099 B2 | 4/2008 | Shand | |
| 7,366,111 B2 | 4/2008 | Thubert et al. | |
| 7,391,730 B1 | 6/2008 | Chandra et al. | |
| 7,428,221 B2 | 9/2008 | Thubert et al. | |
| 2003/0231585 A1* | 12/2003 | Motegi et al. ................. | 370/229 |
| 2004/0028023 A1* | 2/2004 | Mandhyan et al. ........... | 370/351 |
| 2005/0018667 A1 | 1/2005 | Chandra et al. | |
| 2005/0041627 A1* | 2/2005 | Duggi ........................... | 370/338 |
| 2006/0098608 A1* | 5/2006 | Joshi ............................. | 370/338 |
| 2006/0159082 A1 | 7/2006 | Cook et al. | |
| 2007/0019647 A1 | 1/2007 | Roy et al. | |
| 2007/0110024 A1 | 5/2007 | Meier | |
| 2007/0206547 A1 | 9/2007 | Gong et al. | |
| 2008/0137580 A1* | 6/2008 | Axelsson et al. ............. | 370/315 |
| 2008/0170550 A1 | 7/2008 | Liu et al. | |
| 2009/0129316 A1* | 5/2009 | Ramanathan et al. ........ | 370/328 |
| 2010/0118727 A1* | 5/2010 | Draves et al. ................. | 370/252 |

OTHER PUBLICATIONS

Cisco Technology, Inc., PCT Notification of Transmittal of the International Search Report and the Written Opinion of the International Searching Authority, or the Declaration, International Filing No. PCT/US2009/006123, International Filing Date: Nov. 16, 2009, Date of Document Mailing: Jan. 29, 2010, 15 pages.
Bhargavan, K., Network Event Recognition, University of Pennsylvania, 2002, XP002563841, Retrieved from the Internet: http://research.microsoft.com/en-us/um/people/karthb/pubs/network_-event-recognition-thesis.pdf, retrieved Jan. 18, 2010, pp. 77-90.
Oh, M., An Adaptive Routing Algorithm for Wireless Mesh Networks, 10th International Conference on Advanced Communication Technology, Piscataway, NJ, Feb. 2004, pp. 2087-2091.

\* cited by examiner

*Primary Examiner* — Djenane Bayard
(74) *Attorney, Agent, or Firm* — Cesari and McKenna, LLP

(57) ABSTRACT

In one embodiment, a more capable device (MCD) in a computer network may determine one or more a critical destinations (CDs), and may transmit an unsolicited reactive routing route request (RREQ) message to each CD. The MCD may then receive a route reply (RREP) message from the CDs having a route from the MCD to the CD, and may store the route at the MCD. Subsequently, the MCD may transmit a RREP message of its own to one or more less capable devices (LCDs) to provide the route from each respective LCD to the CD via the MCD.

28 Claims, 5 Drawing Sheets

SELECTIVE A PRIORI REACTIVE ROUTING

TECHNICAL FIELD

The present disclosure relates generally to computer networks, and, more particularly, to reactive routing in computer networks.

BACKGROUND

With proactive routing protocols, routers in a computer network compute their routing tables a priori for "all" destinations (i.e., ahead of requiring the routes). Proactive routing protocols are more expensive in terms of memory, but routes are known in advance of sending traffic from any node to any other node in the network, thus avoiding delays to compute routes when transmitting data through the network. Conversely, reactive routing protocols are "on-demand" routing protocols, where a route is computed when needed using a request/reply technique. Often, reactive routing may be used where resources are limited, e.g., low power devices and/or devices with reduced memory or processing capabilities. Consequently, only a subset of routes to destinations are maintained at nodes/devices operating according to a reactive routing protocol, particularly those routes that are currently being utilized. Therefore, there is generally a delay to determine routes to particular destinations when needed in reactive routing, due in particular to the propagation of request and reply messages and the necessary path computation for each flow of traffic originated to a destination.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a more capable device (MCD) in a computer network may determine one or more a critical destinations (CDs), and may transmit an unsolicited reactive routing route request (RREQ) message to each CD. The MCD may then receive a route reply (RREP) message from the CDs having a route from the MCD to the CD, and may store the route at the MCD. Subsequently, the MCD may transmit a RREP message of its own to one or more less capable devices (LCDs) to provide the route from each respective LCD to the CD via the MCD.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links.

Sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Sensor networks are typically wireless networks, though wired connections are also available. That is, in addition to one or more sensors, each sensor device (node) in a sensor network may generally be equipped with a radio transceiver or other communication port, a small microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized database management nodes that obtain the data for use with one or more associated applications. In a "push mode," the sensors transmit their data to the sensor sink without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink.

Figure 1:
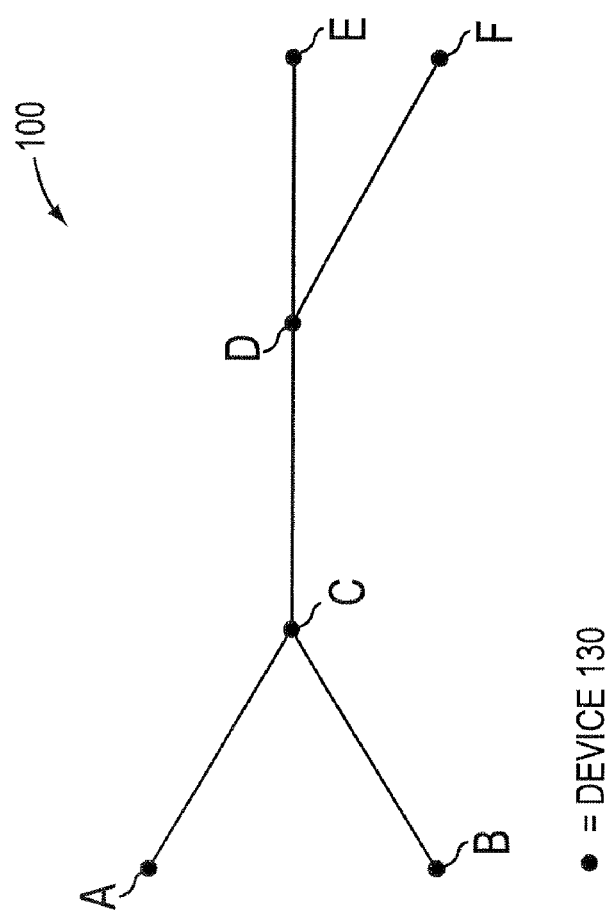
FIG. 1 illustrates an example computer network.

FIG. 1 is a schematic block diagram of an example computer network 100 illustratively comprising nodes/devices, such as one or more devices 130 (e.g., A, B, C, etc.) interconnected by links (not generally shown for clarity). For instance, as described herein, certain devices 130 may be more capable devices (MCDs), less capable devices (LCDs), or critical destinations or devices (CDs). Those skilled in the art will understand that any number of nodes, devices, links, etc. may be used in the computer network, and that the view shown herein is for simplicity. The links (not shown) may be wired links for electronic and/or optical transmissions, or may comprise a wireless communication medium, as will be appreciated by those skilled in the art, where certain nodes 130 may be in communication with other nodes 130, e.g., based on distance, signal strength, current operational status, location, etc.

Data packets (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), various proprietary protocols, etc. In this context, a protocol consists of a set of rules defining how the nodes interact with each other.

Figure 2:
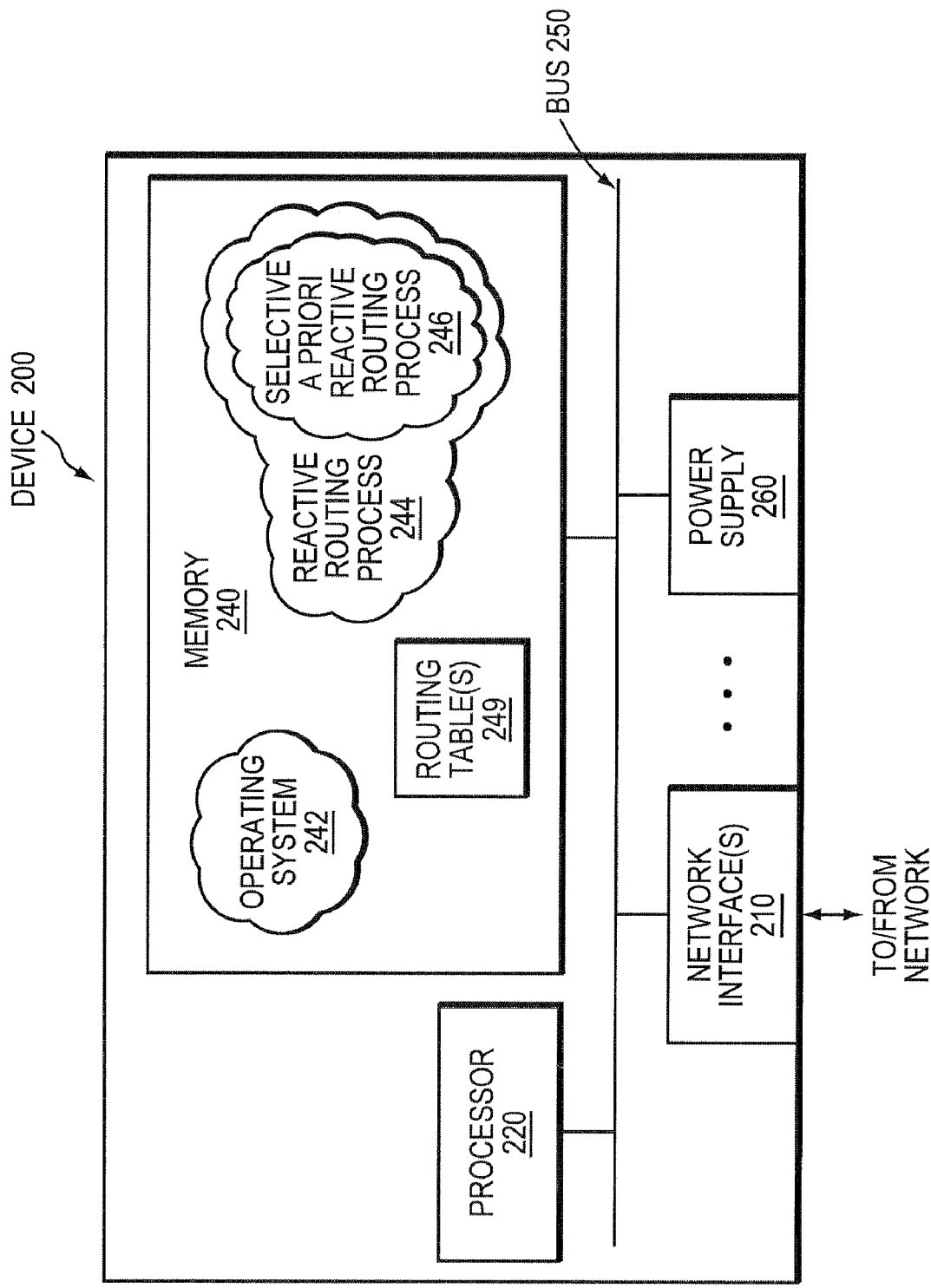
FIG. 2 illustrates an example device.

FIG. 2 is a schematic block diagram of an example node/device 200 that may be advantageously used with one or more embodiments described herein, e.g., as a device 130. The device comprises one or more network interfaces 210, a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, wireless protocols (e.g., IEEE Std. 802.14.5, WiFi, Bluetooth®), Frame Relay, Ethernet, powerline converter (PLC) protocols, etc.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures, such as routing table 249, described below. An operating system 242, portions of which are typically resident in memory 240 and executed by the processor, functionally organizes the device by, inter alia, invoking operations in support of software processes and/or services executing on the device. These software processes and/or services may comprise, as described herein, a reactive routing process 244, and an illustrative subset, a selective a priori reactive routing process 246. It will be apparent to those skilled in the art that other processor and memory types, including various computer-readable media, may be used to store and execute program instructions pertaining to the inventive techniques described herein.

Reactive routing process (services) 244 contains computer executable instructions executed by the processor 220 to perform functions provided by one or more routing protocols, such as in accordance with conventional reactive routing protocols as will be understood by those skilled in the art. These functions may be configured to manage a routing table 249 containing, e.g., data used to make routing decisions. In particular, unlike in proactive routing, where connectivity is discovered and known prior to computing routes to any destination in the network (e.g., Optimized Link State Routing, "OLSR"), reactive routing, on the other hand, discovers neighbors (i.e., does not generally have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes 130 (e.g., small, distributed, low-power devices, such as sensors), and to limit the number of updates to stored topologies due to the ad-hoc changing nature of the network.

For example, AODV is a reactive routing protocol (establishes a route to a destination only on demand) that is a distance-vector routing protocol (and uses sequence numbers on route updates to avoid various known problems with distance-vector protocols). In AODV, the network is silent until a connection is needed to transmit data packets to a destination, at which time the node requiring a connection broadcasts a request for connection (a route request, or "RREQ" message). Other nodes forward this request, recording the node from which the request was received, until the destination is reached, or until a node is reached that has a previously learned route to the destination. At that time, a reply (a route reply, or "RREP" message) is returned to the requesting source node backwards along the recorded route, and the requesting node (and any intermediate node) thus learns a route (i.e., the next hop node) to the destination, and stores this information (the next-hop node) in routing table 249. (Notably, a plurality of routes is often learned, and the requesting node is configured to select a "best" route, such as based on a hop count, cost, etc.). When a link in the network fails, a routing error is passed back to a transmitting node, and the process to learn a route to the destination repeats. Sequence numbers may be used to determine a most recently route, as ad-hoc networks tend to change topology often.

DSR, on the other hand, is another reactive routing protocol that is similar to AODV, however, DSR uses source routing instead of relying on the routing table at each intermediate device. A similar technique using route requests and replies are again used, but now the source node includes the entire path within data packets sent to the destination. In this manner, the intermediate nodes need not store (or update) information in routing tables. Note that each intermediate node may still cache the entire path to the destination (in routing table 249), which may be used to reply to a route request quickly, as the intermediate node is aware (at least temporarily) of a path to the requested destination.

In other words, regardless of the specific protocol used for reactive routing (AODV, DSR, DYMO, etc.), a similar technique may be used to obtain routes to a particular destination, whether that route is stored locally on intermediate nodes or is transmitted with the data packet (source routing). Specifically, the use of general "route request" messages and "route reply" messages may be used, accordingly, to obtain the desired paths through the network 100, as may be appreciated by those skilled in the art.

As noted above, reactive routing protocols are "on-demand" routing protocols where a route is computed when needed using a request/reply paradigm. Consequently, only a subset of routes (e.g., the one that the requesting node needs) are maintained. That is, reactive protocols allow for optimizing the memory consumption, but imply some undesirable delays when routes are needed (that is, the time required to send the request and receive the routes in replies). (Notably, while there are other aspects that differentiate proactive and reactive routing protocols, one particular concern addressed herein is the delay associated with obtaining a route using a reactive routing protocol.)

Often, networks may comprise a variety of nodes of different nature and capabilities. However, in order to maintain protocol operations across all nodes, it is generally required to use a "least denominator" approach (based on operating the protocol at the less capable devices). This correspondingly leads to deploying reactive protocols in certain networks with less capable devices (e.g., sensor networks), which implies the delays associated with reactive routing detailed above.

Selective a Priori Reactive Routing

According to embodiments of the disclosure, a set of more (or most) capable devices (MCDs) in the network 100 may be systematically populated with routes to critical destinations (CDs), whereas a set of less (or least) capable devices (LCDs) may continue to use a (mostly) conventional reactive routing approach. In particular, mechanisms are described herein to dynamically determine the set of CDs. Different from merely combining proactive and reactive routing, the embodiments described herein only use a reactive routing protocol. For certain CDs, however, reactive mechanisms are used in advance, thus improving the convergence times without having to manage two routing protocols. In other words, the techniques described herein are directed to an approach where a reactive routing protocol may be universally implemented in a network 100, while minimizing the response delays for critical routes (as opposed to complex and cumbersome combinations of proactive and reactive routing protocols in a same network).

Illustratively, the techniques described herein may be performed by hardware, software, and/or firmware, such as in accordance with a selective a priori reactive routing process 246, which may contain computer executable instructions executed by the processor 220 to perform functions relating to the novel techniques described herein, e.g., in conjunction with reactive routing process 244 operating in a conventional manner. (Note that while two processes 244 and 246 are shown, those skilled in the art will appreciate that this is merely representative, and a single modified process or multiple smaller processes may be implemented to achieve the results afforded by the embodiments described herein.) For instance, selective a priori reactive routing process 246 may operate specifically on MCDs or on CDs (or, as described below, on devices 130 in general capable of being either an LCD or MCD), and may perform one or more of the selective a priori reactive routing techniques per that device's responsibilities as described herein.

Notably, as used herein, an MCD generally is any device 130 in the network that is configured to operate according to the techniques relating to MCDs below. Illustratively, for example, an MCD may be a device with greater capability (e.g., memory, processing, etc.) than an LCD, although such a distinction is not necessary. The terms MCD and LCD, therefore, merely refer to a device's operational configuration, and not to a degree of capability.

Operationally, an MCD (e.g., all MCDs in the network, or a "dominating set" of MCDs, as will be understood by those skilled in the art) may first determine one or more CDs in the network 100. For example, critical destinations may be marked and announced using a light flooding (announcement) mechanism, or stored in a central policy engine (e.g., a device), which may be polled by the MCDs upon startup (e.g., registration). Critical destinations, in general, are common in networks that employ "many-to-few" or "many-to-one" topologies, in which a large number of devices transmit a vast majority of traffic to the same smaller number of devices. One example of such a network is a sensor network, where potentially millions of sensors transmit their data to the same sink device (e.g., a management server, Layer-3 gateways, etc.). Accordingly, in networks such as this, down to 1% of the devices in the network are destinations for up to 99% of the traffic. (Hence, "selective" a priori reactive routing implies that only certain nodes, MCDs, need cooperate, and only routes to certain destinations, CDs, need be obtained.)

Critical destinations, or CDs, may thus be determined through knowledge of where the "important" destinations are (e.g., the servers, gateways, etc.), and propagation of that knowledge into the network. For instance, as mentioned, a flooded advertisement may be originated by the CDs themselves (or other management nodes/devices) towards all leaves of a tree (or broadcast in the network), where each leaf of the tree is an MCD. Alternatively, each MCD may register to the network, and may receive a set of CDs in response. For an example, with reference to FIG. 1, assume that node C is an MCD, and that node E and F are CDs. Nodes A and B are LCDs, and node D may or may not be an MCD.

Notably, according to an alternative embodiment, an MCD may determine CDs based on analysis of traffic in the network 100. For example, an MCD may be able to determine that a very high percentage of traffic is being sent to a same destination or set of destinations in the network, and may determine dynamically that those destinations are critical, thus marking them as CDs. In this manner, an MCD may act alone, and there is no need for the CDs to participate (flood advertisements) or for a centralized policy engine (to transmit CD lists).

Once the set of CDs is determined (e.g., node E), an MCD (e.g., node C) may trigger an unsolicited route request (RREQ) message using the reactive routing protocol for all CDs (a priori), and stores the results in routing table 249. In particular, a conventional RREQ message may be generated and sent toward the desired destination, but is "unsolicited" because it is not in response to an actual need to send traffic. Rather, according to the novel techniques herein, the RREQ message is an a priori request, since there is a very good chance that there will be traffic sent in the network toward the destination.

Figure 3:
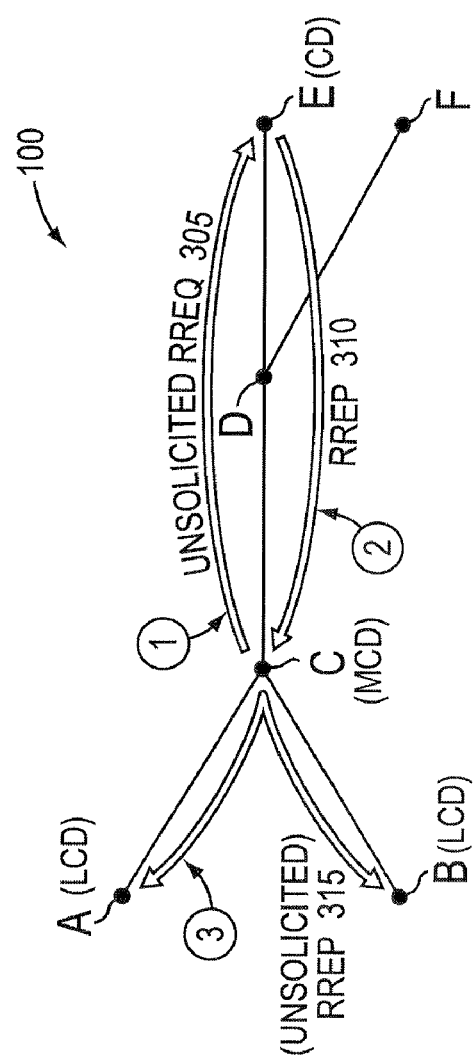
FIG. 3 illustrates an example network showing selective a priori reactive routing.

FIG. 3 illustrates an example message exchange in the network 100 of FIG. 1 in accordance with selective a priori reactive routing as described herein. For instance, an unsolicited RREQ message 305 may be sent from MCD node C to a CD node E, as mentioned above. As such, a conventional route reply (RREP) message 310 may be sent from the CDs in response to the RREQ message, thus returning to the MCD a route (or path) from the MCD to the CD (e.g., node C to node D to node E). The MCD may then store (or cache) the a priori route entry, e.g., in routing table 249, assuming that the received route is either previously unknown, or better than a route currently stored to the CD (i.e., that is still valid).

Optionally, a plurality of paths may be returned from a single CD, such as for diverse paths, paths with different attributes (e.g., bandwidth, resources, delay, hop count, etc.), etc. The receiving MCD may thus store/cache each route or a subset of the routes (e.g., after selecting a best few, primary/backup pairs, etc.) with various weights (e.g., for asymmetrical load sharing, possible due to source routing).

Having stored/cached the a priori routes at the MCD, the MCD (e.g., node C) may then transmit a RREP message 315 from the MCD to one or more less capable devices (LCDs) (e.g., nodes A and B) to provide the route from each respective LCD to the CD via the MCD. For example, the transmitted RREP message 315 may be an unsolicited RREP message, and the LCDs may or may not wish to save the information (i.e., storing the route or discarding the unsolicited RREP message). In this manner, the LCDs may cooperate with the a priori distribution of CD routes by simply storing/caching the routes to the CD.

Alternatively, one or more embodiments herein maintain an LCD's conventional reactive routing operation, such that LCDs only rely on on-demand routing. As such, the MCD may first receive a conventional RREQ message from a particular LCD to request a route to the CD. Then in response, the RREP message 315 is transmitted to the particular LCD with the known route to the CDs.

Notably, according to one or more embodiments described herein, the route carried within the RREP message 315 may optionally present the MCD as the hop right before the destination CD so the LCD's event horizon may be primarily limited to the nearest MCDs. In other words, the RREP message 315 may illustratively comprise a route having the transmitting MCD (e.g., node C) as a last hop to the CD (e.g., node E) regardless of additional hops between the MCD and the CD (e.g., node D). Accordingly, when an LCD sends a source routed packet (having the path contained in a header of the packet) via an MCD, the MCD may swap routing headers of the packet with the full path to the destination, thus inserting the additional hops between the MCD and the CD into the path of the source routed packet.

By obtaining routes to critical destinations before they are needed, and storing those routes at MCDs (e.g., and optionally certain LCDs), the novel techniques herein alleviate much of the delay associated with reactive routing protocols, yet maintain a "pure" reactive routing network, with selective a priori reactive routing modification. Unlike proactive routing, however, reactive routing is not generally configured to monitor or detect topology changes, since a new route is generally computed each time it is needed. The selective a priori reactive routing techniques, which store advanced-obtained routes, may thus periodically re-transmit the unsolicited RREQ message 305 from the MCD to the CD to update the route from the MCD to the CD, accordingly. For example, a refresh timer may be configured, such that after the expiration of which, a new RREQ message 305 is originated to update the routes toward each critical destination (e.g., every 5-10 minutes). (Note that one enhancement to the techniques herein is that in the event of an alarm message, a device 130 may transmit a packet to a CD on the a priori known route, and then re-request a route all the way to the CD to ensure that the route is still valid.)

Figure 4:
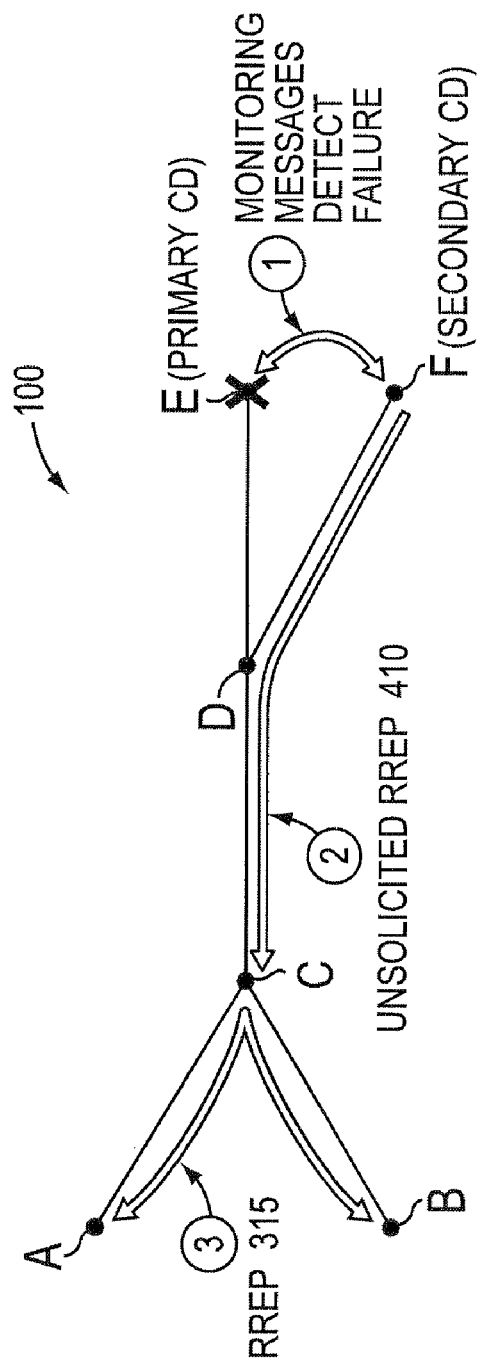
FIG. 4 illustrates an example network showing a backup technique for selective a priori reactive routing.

In addition to the techniques described above, unsolicited RREP messages may be used for backup purposes. For example, consider the typical case of primary and secondary sinks (CDs) in a sensor network, e.g., nodes E and F, respectively, as shown in FIG. 4 (illustrating another example message exchange). The backup CD (node F) may monitor the state of the primary CD (node E), such as through keepalive protocols (e.g., BFD, ICMP, etc., as will be understood). Upon detecting a primary CD failure, the backup CD may generate an unsolicited RREP message 410 announcing itself to all MCDs (and thus, generating the route to the secondary CD), along with an indication that the MCDs use the secondary CD (e.g., a flag, opcode, etc.). When the MCDs receive the unsolicited RREP message 410, the stored route to the primary CD may be changed to the route to the secondary CD. In this manner, when LCDs request a route to the primary CD, the MCD may simply respond with a route to the secondary CD, or may even go so far as to respond with a route to the primary CD, and upon receiving packets destined to the primary CD, swapping the path to forward the packets to the secondary CD (thus keeping the LCDs uniformed of the change). This technique is faster (more efficient) than a classic approach where new routes to the secondary CD would be recalculated after detecting the failure in the network (e.g., forcing nodes to re-request routes to the secondary CD).

Note also, that according to one or more embodiments herein, unsolicited RREP messages may also be used from any CD to distribute a priori routes to itself for any MCD that is interested, without the need for an unsolicited RREQ message. For example, a CD may generate an unsolicited RREP message 410 announcing itself to all MCDs, such that when a MCD receives the unsolicited RREP message 410, it may store the route to the CD, accordingly.

Moreover, with the architecture described herein, the nature of a device 130 (LCD versus MCD) may optionally be defined as a dynamic attribute. That is, once the node/device is initially inserted into the network, it can dynamically determine its role based on a set of attributes, such as a number of CDs in the network, an available memory of the device; and an energy level of the device, etc. For example, a node (e.g., node A or B) may determine that it can play the role of an MCD since the number of CDs in the network is fairly limited. Furthermore, a node (e.g., node C) may decide to release its MCD status and become an LCD if it is running out of resources at some point in time (e.g., low energy level). The dynamic nature of the device status thus provides a high degree of flexibility with minimal configuration.

Figure 5:
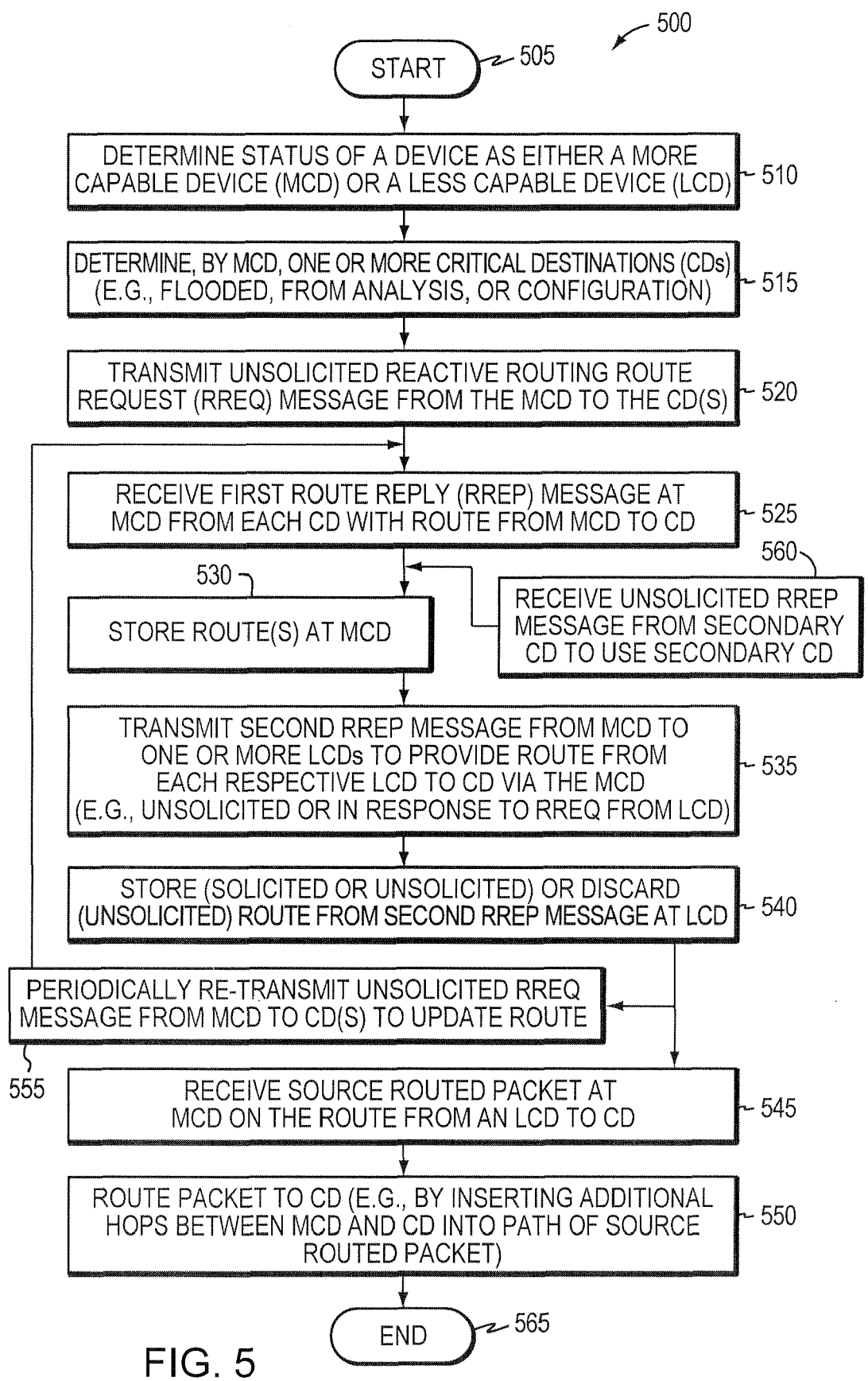
FIG. 5 illustrates an example procedure for selective a prior reactive routing.

FIG. 5 illustrates an example procedure for selectively applying a priori reactive routing in accordance with one or more embodiments described herein. The procedure 500 starts at step 505, and continues to step 510, where a device 130 may determine whether it is an MCD or an LCD, such as dynamically based on various attributes or manually based on configuration. Assuming the device is an MCD (e.g., node C), in step 515 the MCD may determine one or more CDs in the network, such as through receiving flooded announcements, analyzing the flows in the network, or other configuration (e.g., polling a central engine). Accordingly, the MCD may then, in step 520, transmit an unsolicited RREQ message 305 to the CD(s), e.g., to node E.

In response to the unsolicited RREQ message(s), the MCD may then receive RREP messages 310 from the CD(s) in step 525 having the returned routes from the MCD to the CD. These routes may be stored in step 530 (e.g., in routing table 249) at the MCD (assuming the route is better than any already stored by the MCD), and then transmitted in step 535 as a RREP message 315 to one or more LCDs (e.g., node A and node B) to provide a route from each respective LCD to the CD via the MCD.

As described above, the transmitted RREP message(s) 315 may be unsolicited or in response to RREQ messages from the LCDs. Accordingly, in step 540, the LCDs may store the received routes where they were solicited, or where interested in the unsolicited route, or may discard an unsolicited route, depending upon various factors described herein. The LCDs may then, as necessary, send packets toward the CD using the path from the MCD (e.g., via the MCD). In the event the packet is a source routed packet received at the MCD at step 545, and if the MCD declared itself as the last hop (as mentioned above), then in step 550 the MCD may route the packet to the CD, for example, by inserting additional hops between MCD and CD into path of source routed packet (e.g., node D).

The procedure 500 may end in step 565, illustratively with the option in step 555 to periodically re-transmit the unsolicited RREQ message from the MCD to the CD(s) to update the route (returning to step 525). Also, as described above, the procedure may additionally allow for receipt of an unsolicited RREP message 410 in step 560 from a secondary CD (e.g., node F) to use a route to the secondary CD, (returning to step 530). (Those skilled in the art will appreciate that while certain events are shown in a particular order, the steps of procedure 500 are merely examples, and may include further details or may be omitted.)

Advantageously, the novel techniques described herein selectively apply a priori reactive routing in a computer network. By sending unsolicited reactive routing RREQ and RREP messages to a priori distribute routes to critical destinations, the novel techniques reduce route determination time to reach such critical destinations (e.g., a vast majority of the network traffic in certain networks), yet still remain within the operation of reactive routing protocols. In particular, the novel techniques thus provide certain benefits typically characteristic of proactive routing to reactive routing, but without having to utilize complex techniques to merge proactive and reactive routing protocols. Also, the techniques above may help avoid a storm of RREQs from being flooded from LCDs all the way to the CDs in response to a network-wide event, e.g., alarms, etc. Further, the dynamic aspects of one or more embodiments described herein alleviate the need for cumbersome and inefficient manual configuration.

Notably, proposals exist today use mixed approaches consisting of deploying a proactive routing protocol in the "core"

made of the most capable nodes and a reactive protocol at the edge of the network between the least capable nodes and the core nodes. Although technically appealing, however, this approach is fairly complex to manage because it requires deploying non-trivial mixed routing protocols (proactive and reactive) in the network and has not been widely adopted because of this issue. In other words, mixed approaches using proactive routing protocols in some part of the network and reactive routing protocol in other part of the network are known, though such current implementations are quite problematic, especially from an operational standpoint. In the embodiments described herein, however, only a reactive routing protocol is used in the entire network, *but* for some critical destinations a modified reactive routing mechanism (a priori unsolicited route requests and replies) between a selective set of nodes (e.g., MCDs and CDs). Accordingly, the novel techniques described herein advantageously improve convergence times in a reactive network without having to manage two separate routing protocols, where boundaries between a priori reactive routing and conventional reactive routing is dynamically maintained by the connection of LCDs to MCDs, which is also a dynamic status as described herein.

While there have been shown and described illustrative embodiments that selectively apply a priori reactive routing in a computer network, it is to be understood that various other adaptations and modifications may be made within the spirit and scope of the present invention. For example, the embodiments have been shown and described herein for use with particular reactive routing protocol request/reply messages. However, the embodiments of the invention in their broader sense are not so limited, and may, in fact, be used with any similarly operational reactive routing technique. In addition, while various references to sensors or sensor networks have been made as an example network that may benefit from reactive routing protocols, any type of network using reactive routing may benefit from the teachings herein, and the embodiments are not limited to sensor networks.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining, by a more capable device (MCD), a critical destination (CD) in a computer network, wherein a device is determined to be a MCD based on one or more attributes at the device or a manual configuration;
   transmitting an unsolicited reactive routing route request (RREQ) message from the MCD to the CD while there is an absence of any present need to send data traffic to the CD;
   receiving a first route reply (RREP) message at the MCD from the CD, the first RREP message having a route from the MCD to the CD;
   storing the route at the MCD; and
   transmitting a second RREP message from the MCD to one or more less capable devices (LCDs) to provide the route from each respective LCD to the CD via the MCD, wherein a device is determined to be a LCD based on one or more attributes at the device or a manual configuration.

2. The method as in claim 1, further comprising:
   receiving a RREQ message at the MCD from a particular LCD to request a route to the CD, wherein the second RREP message is transmitted from the MCD to the particular LCD in response to the received RREQ message.

3. The method as in claim 1, wherein the second RREP message is an unsolicited RREP message transmitted in response to storing the route at the MCD.

4. The method as in claim 3, further comprising:
   at the LCD, one of either storing the route to the CD from the unsolicited RREP message or discarding the unsolicited RREP message.

5. The method as in claim 1, wherein the second RREP message presents the MCD as a last hop to the CD regardless of additional hops between the MCD and the CD.

6. The method as in claim 5, further comprising:
   receiving a source routed packet at the MCD on the route from an LCD to the CD, the source routed packet having a path; and
   inserting the additional hops between the MCD and the CD into the path of the source routed packet.

7. The method as in claim 1, wherein the CD is a primary CD, the method further comprising:
   receiving an unsolicited RREP message at the MCD from a secondary CD, the unsolicited RREP message having a route from the MCD to the secondary CD and an indication to use the secondary CD; and
   in response, changing the stored route to the primary CD to the route to the secondary CD.

8. The method as in claim 1, further comprising:
   receiving an unsolicited RREP message at the MCD from the CD, the unsolicited RREP message having a route from the MCD to the CD; and
   storing the route to the CD at the MCD in response to receiving the unsolicited RREP message from the CD.

9. The method as in claim 1, further comprising:
   determining, by the MCD, a plurality of CDs;
   transmitting an unsolicited RREQ message from the MCD to each of the CDs;
   receiving first RREP messages at the MCD from each CD; and
   storing routes from the first RREP messages at the MCD for each CD.

10. The method as in claim 1, wherein the unsolicited RREQ message returns a plurality of routes to the CD.

11. The method as in claim 10, further comprising:
    selecting and storing a subset of the plurality of routes to the CD at the MCD.

12. The method as in claim 1, further comprising:
    changing a status of a device from one of either an MCD or an LCD to an LCD or MCD, respectively.

13. The method as in claim 12, further comprising:
    dynamically changing the status based on the one or more attributes at the device.

14. The method as in claim 13, wherein the attributes are selected from a group consisting of: a number of CDs in the computer network; an available memory of the device; and an energy level of the device.

15. The method as in claim 1, further comprising:
 determining the CD at the MCD based on analysis of traffic in the network.

16. The method as in claim 1, further comprising:
 determining the CD at the MCD based on receipt of a flooded announcement in the computer network.

17. The method as in claim 1, further comprising:
 determining the CD at the MCD by polling a central policy engine by the MCD upon startup of the MCD.

18. The method as in claim 1, further comprising:
 periodically re-transmitting the unsolicited RREQ message from the MCD to the CD to update the route from the MCD to the CD.

19. An apparatus, comprising:
 one or more network interfaces adapted to communicate with nodes in a computer network in accordance with a reactive routing protocol;
 a processor coupled to the network interfaces and adapted to execute one or more processes; and
 a memory adapted to store a selective a priori reactive routing process executable by the processor, the process when executed operable to:
  determine a critical destination (CD) in the computer network;
  transmit an unsolicited reactive routing route request (RREQ) message to the CD while there is an absence of any present need to send data traffic to the CD;
  receive a first route reply (RREP) message from the CD, the first RREP message having a route from the apparatus to the CD;
  store the route; and
  transmit a second RREP message to one or more less capable devices (LCDs) to provide the route from each respective LCD to the CD via the apparatus, wherein a device is determined to be a LCD based on one or more attributes at the device or a manual configuration.

20. The apparatus as in claim 19, wherein the process when executed is further operable to:
 receive a RREQ message from a particular LCD to request a route to the CD, wherein the second RREP message is transmitted to the particular LCD in response to the received RREQ message.

21. The apparatus as in claim 19, wherein the second RREP message is an unsolicited RREP message transmitted in response to storing the route.

22. The apparatus as in claim 19, wherein the second RREP message presents the apparatus as a last hop to the CD regardless of additional hops between the apparatus and the CD.

23. The apparatus as in claim 22, wherein the process when executed is further operable to:
 receive a source routed packet on the route from an LCD to the CD, the source routed packet having a path; and
 insert the additional hops between the apparatus and the CD into the path of the source routed packet.

24. The apparatus as in claim 19, wherein the process when executed is further operable to:
 receive an unsolicited RREP message from the CD, the unsolicited RREP message having a route to the CD; and
 store the route to the CD at the apparatus in response to the unsolicited RREP message from the CD.

25. A non-transitory computer-readable media having software encoded thereon, the software when executed on a device operable to: determine a critical destination (CD) in a computer network; transmit an unsolicited reactive routing route request (RREQ) message to the CD while there is an absence of any present need to send data traffic to the CD; receive a first route reply (RREP) message from the CD, the first RREP message having a route from the device to the CD; store the route; and
 transmit a second RREP message to one or more less capable devices (LCDs) to provide the route from each respective LCD to the CD via the device, wherein a device is determined to be a LCD based on one or more attributes at the device or a manual configuration.

26. A method, comprising:
 determining, by a first device, a particular destination in a computer network;
 transmitting an unsolicited reactive routing route request (RREQ) message from the first device to the particular destination while there is an absence of any present need to send data traffic to the particular destination;
 receiving a first route reply (RREP) message at the first device from the particular destination, the first RREP message having a route from the first device to the particular destination; and
 transmitting a second RREP message from the first device to one or more second devices to provide to the one or more second devices a route for each respective second device to the particular destination via the first device.

27. The method as in claim 26, further comprising:
 receiving a RREQ message at the first device from a particular second device to request a route to the particular destination, wherein the second RREP message is transmitted from the first device to the particular second device in response to the received RREQ message.

28. The method as in claim 26, wherein the first device comprises a network interface, a processor, and a memory.

* * * * *